(12) United States Patent
Vassiliou

(10) Patent No.: US 6,691,380 B2
(45) Date of Patent: Feb. 17, 2004

(54) FASTENERS OF INCREASED HOLDING POWER

(75) Inventor: Eustathios Vassiliou, Newark, DE (US)

(73) Assignee: Eustathios Vassiliou Revocable Trust, Newark, DE (US)

( * ) Notice: Subject to any disclaimer, the term of this patent is extended or adjusted under 35 U.S.C. 154(b) by 0 days.

(21) Appl. No.: 10/195,959

(22) Filed: Jul. 16, 2002

(65) Prior Publication Data

US 2003/0024078 A1 Feb. 6, 2003

Related U.S. Application Data

(60) Provisional application No. 60/310,343, filed on Aug. 6, 2001, provisional application No. 60/326,642, filed on Oct. 2, 2001, provisional application No. 60/308,921, filed on Jul. 31, 2001, and provisional application No. 60/312,867, filed on Aug. 16, 2001.

(51) Int. Cl.$^7$ .................. A44B 17/00; A44B 21/00; F16B 21/00
(52) U.S. Cl. .................. 24/295; 24/289; 24/293
(58) Field of Search .................. 24/289, 292, 293, 24/295, 297, 294; 403/403, 205; 280/770; 411/913

(56) References Cited

U.S. PATENT DOCUMENTS

| | | | |
|---|---|---|---|
| 2,296,046 A | 9/1942 | Miller | 85/11 |
| 2,322,656 A | 6/1943 | Murphy | 24/73 |
| 2,329,688 A | 9/1943 | Bedford, Jr. | 189/88 |
| 2,607,971 A | 8/1952 | Bedford, Jr. | 24/73 |
| 2,825,948 A | 1/1958 | Parkin | 24/73 |
| 2,837,184 A | * 6/1958 | Fernberg | 24/295 |
| 3,208,119 A | 9/1965 | Seckerson | 52/718 |
| 3,473,284 A | * 10/1969 | Meyer | 24/295 |
| 3,524,129 A | 8/1970 | Holton | 24/73 |
| 3,673,643 A | 7/1972 | Kindell | 24/73 B |
| 4,043,579 A | 8/1977 | Meyer | 293/71 |
| 4,074,465 A | 2/1978 | Bright | 49/491 |
| 4,271,634 A | 6/1981 | Andrzejewski | 49/491 |
| 4,324,826 A | 4/1982 | Ginster | 428/122 |
| 4,354,782 A | 10/1982 | Newport | 411/61 |
| 4,382,414 A | 5/1983 | Svirklys | 108/56 |
| 4,402,118 A | 9/1983 | Benedetti | 24/289 |
| 4,630,338 A | * 12/1986 | Osterland et al. | 24/293 |
| 4,644,612 A | * 2/1987 | Osterland | 24/295 |
| 4,865,505 A | 9/1989 | Okada | 411/512 |
| 5,263,233 A | * 11/1993 | Kim et al. | 24/295 |
| 5,314,280 A | 5/1994 | Gagliardi et al. | 411/182 |
| 5,367,751 A | 11/1994 | DeWitt | 24/295 |
| 5,422,789 A | 6/1995 | Fisher et al. | 361/719 |
| 5,533,237 A | 7/1996 | Higgins | 24/289 |

(List continued on next page.)

FOREIGN PATENT DOCUMENTS

| | | | |
|---|---|---|---|
| BE | 632590 | 10/1963 | |
| DE | 577499 | 5/1933 | |
| GB | 1030796 | 5/1966 | |
| GB | 1171363 | 11/1969 | F16B/5/06 |
| IT | 0550316 | 3/1958 | |

Primary Examiner—Robert J. Sandy
(74) Attorney, Agent, or Firm—E. Vassiliou

(57) ABSTRACT

This invention discloses fasteners characterized by the use of barbs to secure a primary object in place. More particularly, the barbs which are used are critically shaped barbs resulting in considerable increase of the holding force without sacrificing the flexibility of the barbs, the force needed to insert part of the primary object into the fastener, and without sacrificing the broad acceptability of various thicknesses of the primary object to be fastened. The distance between the front point of a barb and the respective opposite side structure may preferably be smaller than the thickness of said material, such as sheet metal for example, that the fastener is made from. The fasteners of this invention may also be provided with spring members of intricate and critical structure, which despite easy insertion of the fastener into a slot of a secondary object, the removal force is greatly increased.

62 Claims, 5 Drawing Sheets

U.S. PATENT DOCUMENTS

| | | | |
|---|---|---|---|
| 5,542,158 A | 8/1996 | Gronau et al. | 24/295 |
| 5,887,319 A | 3/1999 | Smith | 24/293 |
| 5,919,019 A | 7/1999 | Fischer | 411/182 |
| 5,987,714 A | 11/1999 | Smith | 24/295 |
| 5,992,914 A | 11/1999 | Gotoh et al. | 296/39.1 |
| 6,101,686 A | 8/2000 | Velthoven et al. | 24/295 |
| 6,141,837 A | 11/2000 | Wisniewski | 24/295 |
| 6,279,207 B1 * | 8/2001 | Vassiliou | 24/293 |
| 6,381,811 B2 * | 5/2002 | Smith et al. | 24/289 |

* cited by examiner

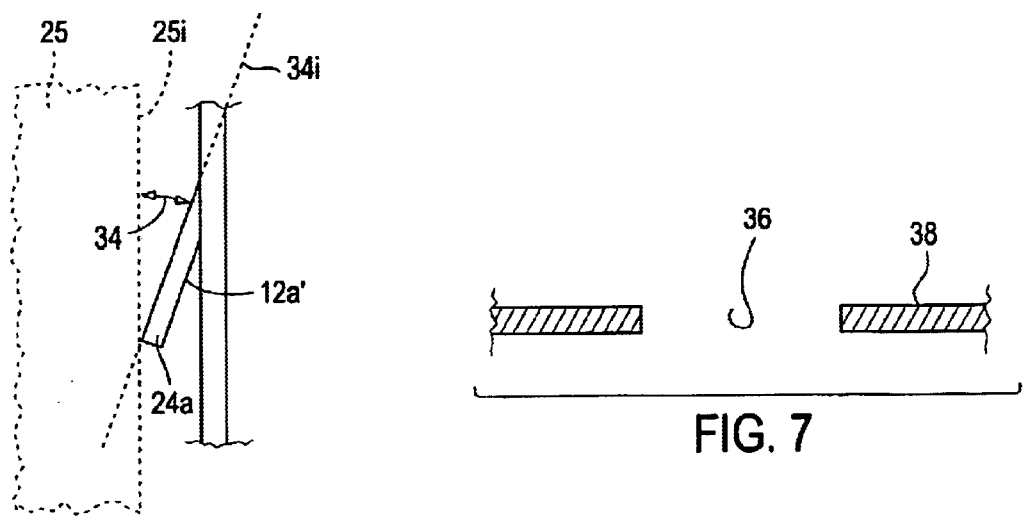
FIG. 6 PRIOR ART
FIG. 7
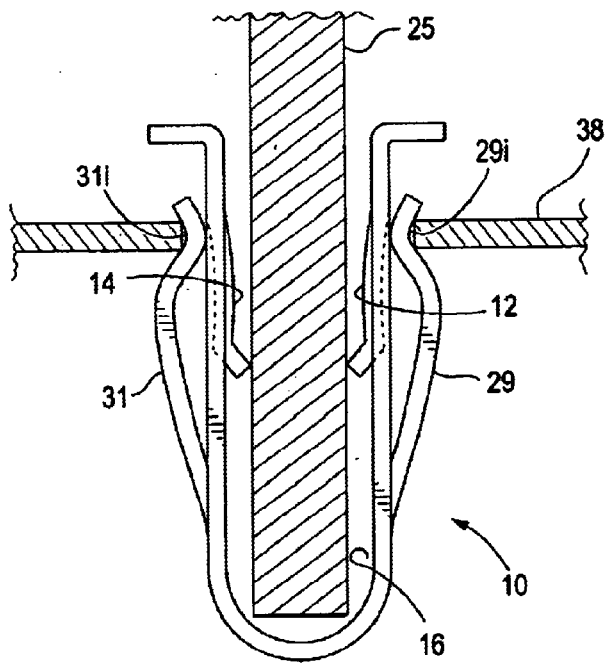
FIG. 8

FASTENERS OF INCREASED HOLDING POWER

RELATED APPLICATIONS

This application claims priority of provisional patent applications No. 60/310,343, filed Aug. 6, 2001, No. 60/326,642, filed Oct. 2, 2001, No. 60/308,921, filed Jul. 31, 2001, and No. 60/312,867, filed Aug. 16, 2001, all four of which are incorporated herein by reference in their entirety.

FIELD OF THE INVENTION

This invention relates to fasteners in general, and more particularly to those fasteners characterized by using barbs and/or spring members to secure a primary object to a secondary object.

BACKGROUND OF THE INVENTION

A large number of fasteners have been used in the past for securing one object on another object, at least partially by means of barbs and/or spring members.

Examples include U.S. Pat. No. 2,296,046; U.S. Pat. No. 2,322,656; U.S. Pat. No. 2,329,688 (the barbs referred to as locking tongues 19; see column 2, lines 14–22), U.S. Pat. No. 2,607,971; U.S. Pat. No. 2,825,948; U.S. Pat. No. 3,208,119; U.S. Pat. No. 3,525,129; U.S. Pat. No. 3,673,643; U.S. Pat. No. 4,043,579; U.S. Pat. No. 4,074,465; U.S. Pat. No. 4,271,634; U.S. Pat. No. 4,324,826; U.S. Pat. No. 4,354,782; U.S. Pat. Nos. 4,382,414; 4,402,118; 4,865,505; U.S. Pat. No. 5,314,280; U.S. Pat. No. 5,367,751; U.S. Pat. No. 5,422,789; U.S. Pat. No. 5,533,237; U.S. Pat. No. 5,542,158 (the barbs referred to as wedge-like extensions; see column 3, lines 10–17), U.S. Pat. No. 5,887,319, U.S. Pat. No. 5,919,019, U.S. Pat. No. 5,987,714, U.S. Pat. No. 5,992,914; U.S. Pat. No. 6,141,837; U.S. Pat. No. 6,101,686; Provisional Specification GB 1030796; Complete Specification GB 1171396; Patent IT 550316; Patent BE 632.590; and Patent DE 577499, among a plethora of other references.

None of these references by themselves or in combination disclose, suggest, or imply the intricate criticalities of the instant invention.

SUMMARY OF THE INVENTION

The instant invention is directed to fasteners characterized by the use of barbs, which may also comprise spring members to secure a primary object to a secondary object. More particularly, the instant invention pertains a fastener comprising a U-shaped configuration, the U-shaped configuration having a fastening region within which at least a part of a primary object can be inserted, the fastener comprising a first structural side and a second structural side opposite to the first structural side, both sides adjacent to the fastening region, the first structural side comprising an outer bent barb, which is a partially cut section of the first structural side and extends into the fastening region, the outer bent barb having a first back portion adjacent to the first structural side and a first front portion pointing toward the second structural side, the first front portion having a first angle with respect to the primary object when the primary object is inserted into the fastening region, which is smaller than a respective second angle that the first front portion would have with respect to the primary object if the outer barb were straight and not bent, the first back portion of the outer bent barb being longer than the first front portion of the first bent barb, the second structural side comprising an inner bent barb, which is a partially cut section of the second structural side and extends into the fastening region, the inner bent barb having a second back portion adjacent to the second structural side and a second front portion adjacent to and pointing toward the first structural side, the second front portion having a third angle with respect to the primary object when the primary object has been inserted into the fastening region, which third angle is smaller than a respective fourth angle that the second front portion would have with respect to the primary object if the inner barb were straight and not bent, the second back portion of the inner bent barb being longer than the second front portion of the inner bent barb.

At least one of the respective back portions of the inner and/or outer bent barb and the respective front portions of the inner and/or outer bent barb is preferably substantially linear.

Further, the distance separating the front portion of the inner barb from the first structural side and/or the front portion of the outer barb from the second structural side is preferably smaller than half a distance separating the first structural side from the second structural side.

Also, preferably, at least one of the first back portion of the outer bent barb and the second back portion of the inner bent barb is at least three times longer than the respective front portion.

In addition, it is preferable that at least one of the first back portion of the outer bent barb and the second back portion of the inner bent barb has an average width, which average width is at least three times shorter than the respective bent barb.

It is also preferable that the fastener is made of steel having a thickness, which thickness is larger than a distance separating the front portion of the outer bent barb from the first structural side.

The front side and the back side of at least one of the outer barb and the inner barb, preferably forms a front/back angle in the range of 5 to 25 degrees.

The fastener of this invention may further comprise a first spring member, the first spring member having a first insertion section and a first engagement section, the first insertion section and the first engagement section separated by a first separating bent, the first engagement section comprising a first base and a first engagement bent potion, the first engagement bent portion directed away from the first base at a fifth angle, and comprising first peaks and first minor recesses, the first base having a first middle portion and a first edge portion.

According to this invention, the fastener may further comprise a second spring member, the second spring member having a second insertion section and a second engagement section, the second insertion section and the second engagement section separated by a second separating bent, the second engagement section comprising a second base and a second engagement bent potion, the second engagement bent portion directed away from the second base at a sixth angle, and comprising second peaks and second minor recesses, the second base having a second middle portion and a second edge portion.

The fifth and/or sixth angle are preferably in the range of 90° to 179°, independently. Further, the first minor recesses may reach the respective base or extend within the respective base.

The peaks have a front peak side and a back peak side. The front peak side may be longer than the back peak side.

The engagement bent portions may be disposed over the respective edge portions of the respective bases, or in any place between the edge portions, such as for example in the vicinity of the middle portion of the respective base.

Each single particular embodiment of the present invention is critical for a specific application. Therefore, only one embodiment may be critical for a certain application, or more than one for other applications.

This invention also pertains a vehicle comprising a fastener connecting a primary object and a secondary object with a fastener as described above.

DESCRIPTION OF THE DRAWING

The reader's understanding of practical implementation of preferred embodiments of the invention will be enhanced by reference to the following detailed description taken in conjunction with perusal of the drawing figures, wherein:

FIG. 6 is a fractional view illustrating the angle between the front portion of a straight barb, according to the prior art, and the side surface of the primary object.

FIG. 7 shows a cross section of a secondary object.

FIG. 8 shows a cross section of the fastener of the present invention with the primary object inserted into the fastening region, and the secondary object engaged with the recesses of the fastener.

DETAILED DESCRIPTION OF THE INVENTION

As aforementioned, the instant invention is directed to fasteners characterized by the use of barbs to secure a primary object onto a secondary object. The fasteners of this invention may also comprise spring members of special design. More particularly, in preferred embodiments, the instant invention pertains a fastener which uses critically shaped barbs in order to increase the holding power of the barbs, and therefore of the fastener, so that the primary object is held by the fastener with an increased holding force. This is accomplished without sacrificing the flexibility of the barbs, without sacrificing the broad acceptability of various thicknesses of the primary object to be fastened, and without sacrificing the easy insertion of the primary object into the fastening region or cavity.

Similar fasteners have also been disclosed in my U.S. Pat. No. 6,279,207 B1, which is incorporated herein by reference, and our patent application Ser. No. 10/164,963, filed Jun. 7, 2002, which is also incorporated herein by reference.

Figures 1, 1A, 1B:
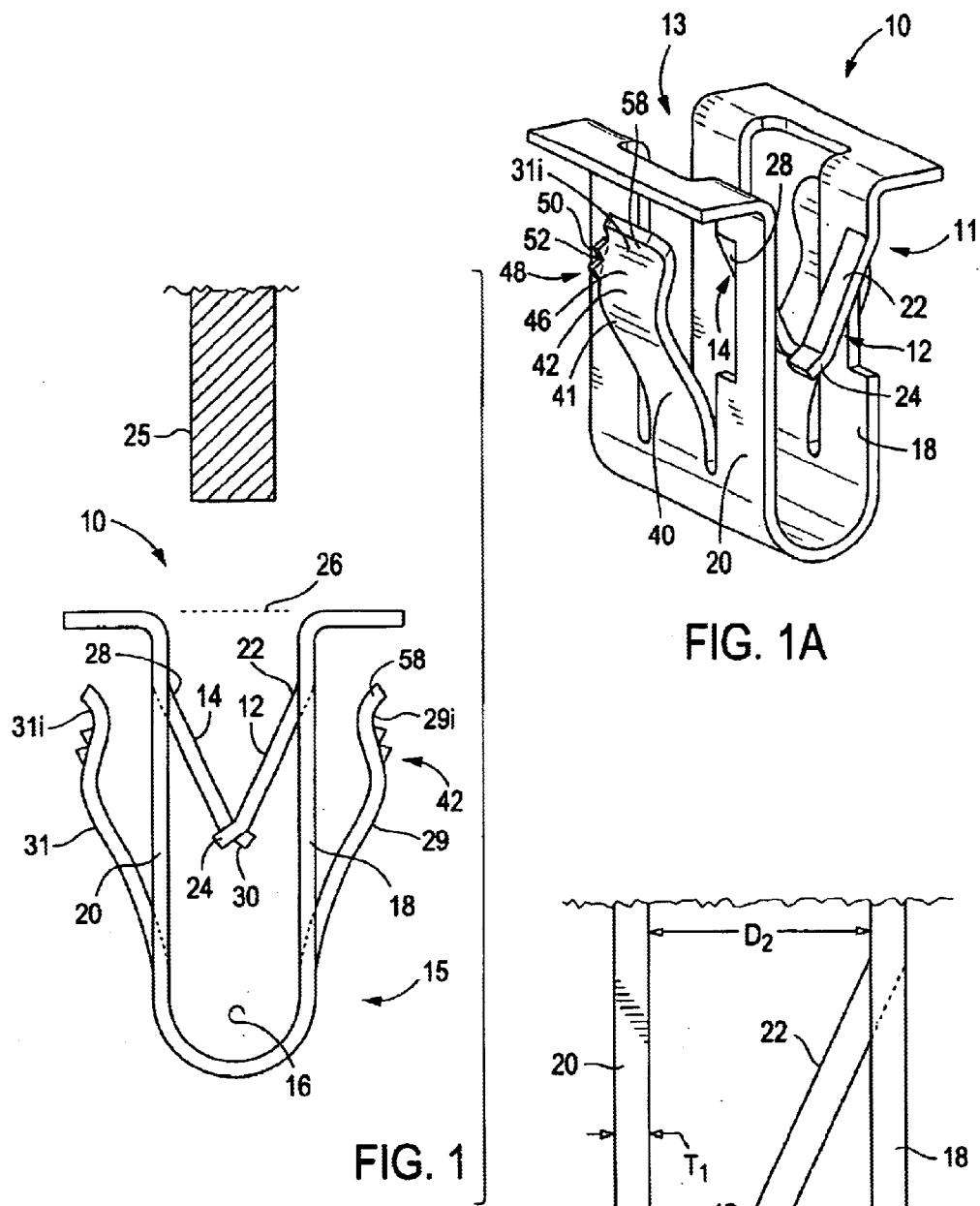
FIG. 1 shows an example of a fastener according to an embodiment of the instant invention.
FIG. 1A is a perspective view of the fastener of FIG. 1, wherein only one inner and one outer barb, as well as only one engagement bent portion are shown for purposes of clarity.
FIG. 1B illustrates a preferred embodiment relating the distance between the front point of the barb and the respective opposite structure with the thickness of the material that the fastener is made from, as well as the front/back angle.

Referring now to FIG. 1, there is depicted a spring fastener 10 according to a preferred embodiment of the present invention.

The Fastener 10 comprises a U-shaped configuration 15. The U-shaped configuration 15 has a fastening region 16, within which at least a part of a primary object 25 can be inserted. The U-shaped configuration 15 of the fastener 10 comprises a first structural side 18 and a second structural side 20 opposite to the first structural side 18. Both sides 18 and 20 are adjacent to the fastening region 16.

The first structural side 18 comprises an outer bent barb 12, which is a partially cut section of the first structural side 18, and extends into the fastening region 16, as better shown in FIG. 1A. The outer bent barb 12 has a first back portion 22 adjacent to the first structural side 18 and a first front portion 24, pointing toward the second structural side 20.

The first front portion 24 has a first angle 32 (see FIG. 5) with respect to the primary object 25, when the primary object 25 is inserted into the fastening region 16, which is larger than a respective second angle 34 (see FIG. 6) that the first front portion 24a would have with respect to the primary object 25, if the outer barb 12a' were straight and not bent.

The first back portion 22 of the outer bent barb 12 is longer than the first front portion 24 of the first bent barb 12; preferably, at least three times as long, in order to improve flexibility. For the same reasons of improving flexibility, it is also preferable that the average width of the first back portion 22 is at least three times shorter than the length of said first back portion 22.

The second structural side 20 comprises an inner bent barb 14, which is a partially cut section of the second structural side 20 and extends into the fastening region 16. The inner bent barb 14 has a second back portion 28 adjacent to the second structural side 20 and a second front portion 30 pointing toward the first structural side 18.

In exactly a similar manner as in the previous case of the outer bent barb 12, the second front portion 30 of the inner barb 14 has a third angle (not shown for purposes of brevity and clarity) with respect to the primary object when the primary object has been inserted into the fastening region, which third angle is larger than a respective fourth angle (not shown for purposes of brevity and clarity) that the second front portion 30 of the inner bent barb would have with respect to the primary object 25 if the inner barb were straight and not bent.

The second back portion 28 of the inner bent barb 14 is longer than the second front portion 30 of the inner bent barb 14; preferably, at least three times as long, in order to improve flexibility. As before, and for the same reasons of improving flexibility, it is also preferable that the average width of the second back portion 28 is at least three times shorter than the length of said second back portion 28.

At least one of the respective back portions of the inner 12 and/or outer 14 bent barb and the respective front portions 24 and 30 of the inner 12 and/or outer 14 bent barb is preferably substantially linear. More preferably, all portions 22, 24, 28, and 30 are linear.

It is also preferable that the distance D1 separating the first front portion 24 (its front point 23) of the outer barb 12 from the second structural side 20, as better shown in FIG. 1B, is smaller than half the distance D2 separating the first structural side 18 from the second structural side 20. This is very important for increasing the holding power of the barbs. The same condition is also preferable regarding the positioning of the second front portion 30 of the inner barb 14 in reference to the first side 18, for the same reasons. Also, the distance D1 between the first front portion 24 (its front point 23) and the second structural side 20 is smaller than the thickness T1 of the material (preferably steel) from which the fastener 10 is made.

Since a small deviation in the angle that a barb touches the primary object 25 has been found to have an unexpectedly large impact on holding power, it is preferable that the front/back angle 42 (see FIG. 1B) between the front and back portions (for example 24 and 22) is in the range of 5 to 25 degrees.

FIG. 1A shows only two barbs at the firs edge 11 of the fastener 10 for purposes of clarity. A pair of similar barbs (not shown) is preferably disposed on the second edge 13 of the fastener 10.

Figure 2:
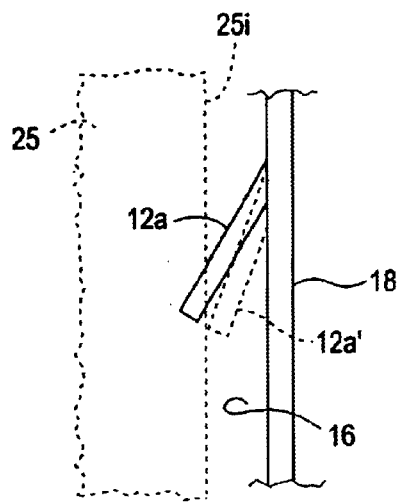
FIG. 2 is a fractional view illustrating the function of a conventional fastener with straight barbs.

In the case of a conventional fastener, a fragmental view of which is better shown in FIG. 2, a straight barb 12a (in the absence of the primary object 25) takes the position 12a' when the primary object 25 is inserted in the fastening region 16.

Figure 3:
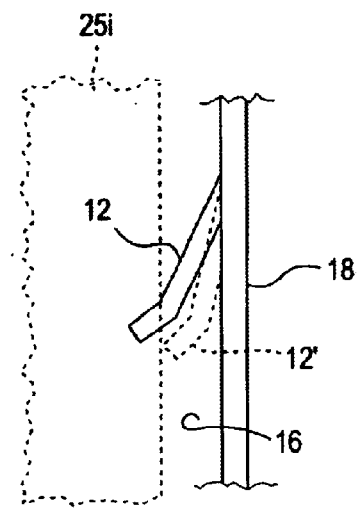
FIG. 3 is a fractional view illustrating the function of a fastener according to the present invention with bent barbs.

In the case of the fastener of the instant invention, a fragmental view of which is better shown in FIG. 3, a bent barb 12 (in the absence of the primary object 25) takes the position 12' when the primary object 25 is inserted in the fastening region 16.

Figure 4:
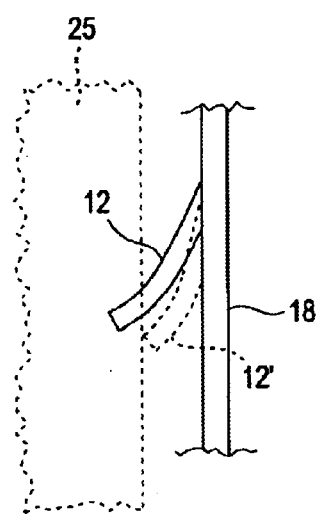
FIG. 4 is a fractional view illustrating the function of a fastener according to the present invention with bent barbs having a curved configuration.

The barb bent can be rather abrupt as shown in FIGS. 1 and 3 or gradual in the form of a curve as illustrated in FIG. 4.

The considerable difference in holding power between the two cases is believed to be due to the higher angle provided between the barb and the primary object by the configuration of present invention as compared to the configuration involving a straight barb.

Figure 5:
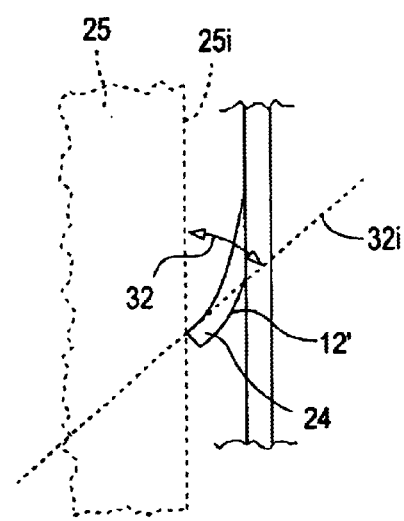
FIG. 5 is a fractional view illustrating the angle between the front portion of a bent barb, according to this invention, and the side surface of the primary object.

This can be better seen in FIGS. 5 and 6. It is very clear that for a similar length of a barb, the angle (first angle) between the front portion 24 of the outer bent barb 12 and the primary object 25 (FIG. 5) is considerably greater than the angle (second angle) between the front portion 24a of the straight barb 12a and the primary object 25 (FIG. 6). The angles are defined as the angle between the side surface 25i of the primary object 25 and the tangent 32i to the first front portion 24, in the case of the bent barb (FIG. 5), and the angle between the side surface 25i of the primary object 25 and the tangent 34i to the first front portion 24a, in the case of the straight barb (FIG. 6).

Although the holding strength of the straight barb 12a may be increased by shortening the barb, increasing the second angle 34, or increasing the average width of the barb, the acceptability of primary objects having various thicknesses decreases drastically. In contrast, a longer bent barb according to the instant invention has considerably higher flexibility, very improved acceptability regarding thickness of the primary object, and considerably higher holding power combined with low insertion force of the primary object.

The same comments and observations are valid regarding barb 14, better shown in FIG. 1, regarding respective a third and a fourth angles (not shown).

The thickness of the primary object can be such as to just fit in the fastening region, or it can be considerably smaller.

All barbs involved are preferably bent barbs, but this invention includes the case where at least one barb complies to the requirements of this invention, and the rest of the barbs are conventional. This invention also encompasses the case in which only one barb according to this invention is present. Nevertheless, it is highly preferable that two outer barbs and two inner barbs are incorporated in the fasteners of the instant invention.

Barbs, such as 12 and 24 for example may have front portions 24 and 30, respectively, which are located apart from each other, as shown in FIG. 1, or they may have front portions overlapping (front portion 24 to be closer to the second structural side 20 than the front portion 30, and front portion 30 to be closer to the first structural side 18 than the front portion 24), as already discussed.

Miscellaneous elements shown in FIGS. 1 to 8, which have not been described above, are described in following embodiments.

In operation of this embodiment, the fastener 10 (FIG. 1) is inserted into the slot 36 of a secondary object 38, as better shown in FIGS. 7 and 8, where it is engaged to the secondary object 38 at the recesses 29i and 31i. The primary object 25 is inserted into the fastening region 16, where it is engaged by the bent barbs 12 and 14. The sequence of the two insertion operations is immaterial. Due to the particular nature of the barbs 12 and 14 of the instant invention, the primary object is held in place with a considerably higher holding power, than if the barbs had a straight configuration. Further, the fastener of this invention may hold primary objects of considerably more variable thickness than the conventional fasteners. In addition the force required to insert a part of the primary object into the fastener is considerably lower than with conventional fasteners. In the Automotive Industry, the primary object is usually but not necessarily a plastic, while the secondary object is usually but not necessarily metal.

This invention also relates to spring fasteners characterized by a structure suitable to be engaged in a slot of a secondary object and secure the primary object on said secondary object. In preferred embodiments of the instant invention, not only part of the primary object is inserted easily into the fastener, combined with difficult removal, but in addition, the secondary object is also connected to the same fastener with ease, combined with considerably more difficult removal.

This is a combination providing excellent and highly desirable connection characteristics to the fastener of the instant invention.

A number of fasteners, which are suitable to be engaged in a slot of a secondary object, such as metal sheet, rigid plastic sheet, and different other types of secondary object, especially in the Automotive Industry, have been used in the past for securing an object on the secondary object through the engaged fastener.

These fasteners comprise one or more, and usually an even number of spring members. In a first class of fasteners, the spring member is caused to reside under the surface of the secondary object, in the vicinity of the slot, in order to hold the fastener secured on said secondary object. Another object (a primary object) may be secured also on the fastener, with the end result to connect the primary object to the secondary object. In such an occasion, the thickness of the secondary object and the dimensions of the spring member have to be designed within very strict tolerances in order to minimize lose connection of the fastener to the secondary object. Even with the very strict tolerances, if the engagement depends only on springingly snapping the spring member into position, there will still be some play.

In the state of the art, a number of solutions have been proposed and utilized, which solutions however, have introduced a different problem. According to this second class of fasteners, the spring member comprises an insertion section and an engagement section connected by a separation bent. The engagement section does not go completely through the slot, but the surface of the engagement section is springingly forced against an edge of the slot. Therefore, any differences in the thickness of the secondary object are accommodated by the length of the engagement section. However, the fastener may now be removed from the slot with a much lower force, than if the spring member were forced to be all the way under the surface of the secondary object in the vicinity of the slot. Due to the different angles that the insertion section and the engagement sections have with respect to the direction of the insertion, it is usually easier to insert the fastener into the slot than to remove it. Removal of the fastener is in some occasions desirable, while in some other occasions may be catastrophic for the application.

The present invention is concerned mainly the second class of fasteners, wherein the engagement section does not go completely through the slot, but the surface of the engagement section is springingly forced against an edge of the slot. The engagement section according to this invention has been critically designed to considerably increase the removal force of the fastener from the slot, without substantially affecting the insertion force.

The fastener 10 may also comprise spring members 29 and 31, which have major recesses 29i and 31i, respectively. Devices having such characteristics have also been disclosed in my Patent Application titled "Increased Holding Power Fasteners". Docket No. AN14, filed on Jul. 9, 2002, and Provisional Applications No. 60/308,921, filed on Jul. 31, 2001, and Provisional Application No. 60,312,867, filed on Aug. 16, 2001, all of which are incorporated herein by reference Referring now to FIG. 9 (see also FIGS. 1 and 1A), there is depicted a partial perspective view of the first spring member 29 according to an embodiment of the instant invention. The first spring member 29 comprises a first insertion section 40 and a first engagement section 42, which are separated by the separating a first separating bent 41.

The first engagement section 42 comprises a first base 46 and a first engagement bent potion 48. The first engagement bent potion 48 comprises first peaks 50 and first minor recesses 52. The first engagement bent portion 48 is directed away from the first base 46 at a fifth angle A2, as better shown in FIGS. 15a, 15b, and 15c. The first base 46 has a first middle portion 54, and a first edge portion 56.

A single engagement bent portion 48 is shown in FIG. 1A for purposes of clarity.

Figure 10:
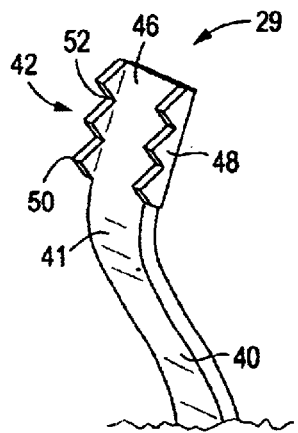
FIG. 10 illustrates a fractional perspective view of a spring member according to another embodiment of the instant invention.
Figure 11:
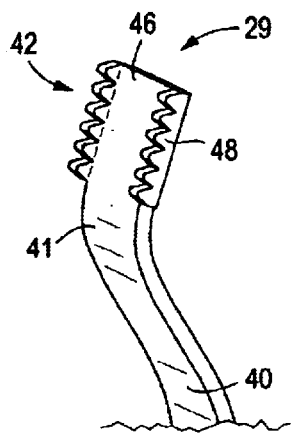
FIG. 11 illustrates a fractional perspective view of a spring member according to another embodiment of the instant invention.

FIGS. 10, and 11 illustrate examples of different other configurations that the engagement section 42 may have.

Figure 12:
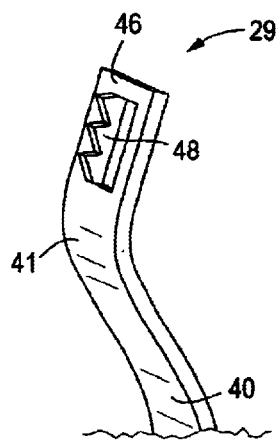
FIG. 12 illustrates a fractional perspective view of a spring member according to another embodiment of the instant invention.
Figure 13:
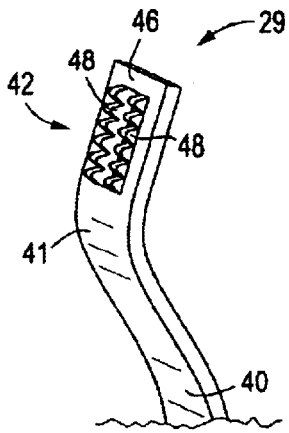
FIG. 13 illustrates a fractional perspective view of a spring member according to another embodiment of the instant invention.

The first engagement bent portions 48 may also be not only over the first edge portions 56, but also in any place between the first edge portions 56, preferably in the vicinity of the first middle portion 54. Examples of such configurations are illustrated in FIGS. 12 and 13. Of course, a multiplicity of first engagement bent portions 48 may also be on the first base 46 of the first engagement section 42.

Figure 14:
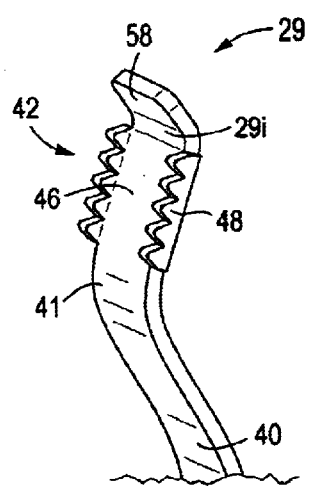
FIG. 14 illustrates a fractional perspective view of a spring member according to another embodiment of the instant invention.

The first engagement section 42 can be followed by any other section, such as first extension portions 58 for example, better shown in FIG. 14. Such first extension portions 58 are utilized often in fasteners.

Figure 15A:
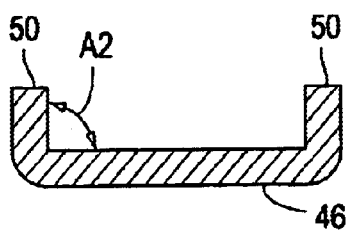
FIG. 15a illustrates a cross-sectional view of the engagement section, through a peak, wherein the engagement bent portion and the base form an angle of substantially 90°.
Figure 15B:
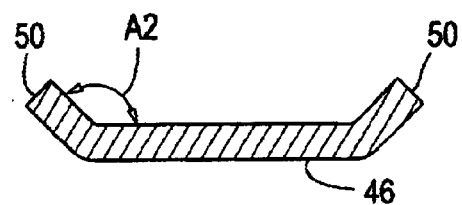
FIG. 15b illustrates a cross-sectional view of the engagement section, through a peak, wherein the engagement bent portion and the base form an angle greater than 90°.
Figure 15C:
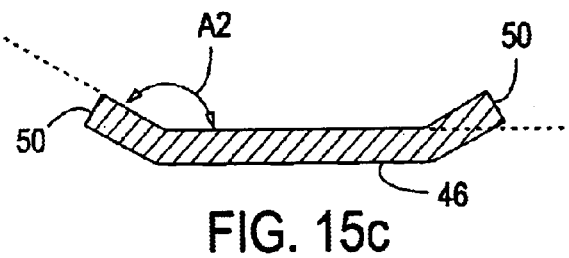
FIG. 15c illustrates another cross-sectional view of the engagement section, through a peak, wherein the engagement bent portion and the base form an angle even greater than that in case of FIG. 15b.

The angle A2 is preferably 90° or larger, and preferably in the range of 90° to 179°. FIGS. 15a, 15b, and 15c are cross sections of an engagement section 42 through peaks 50, in FIG. 9 for example They show examples of angles A being 90° or larger. The angle in all cases is measured between the engagement first bent portion and the solid part (not the empty space) of the first engagement section 42.

Figure 16:
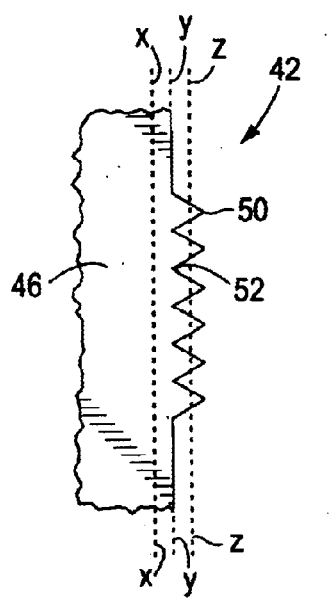
FIG. 16 illustrates the edge of a base having peaks and recesses, before bending a portion of the base to a desired angle around one of lines X—X, Y—Y, or Z—Z.

The first minor recesses 52, preferably reach the first base 46, and in some occasions they extend within the first base 46. This can be better understood by considering the configuration of FIG. 16, which represents an example of an initial zigzag stamping or cutting of one side of the first engagement section 42. If the first bent is made through line X—X to form the first engagement bent portion 48, the first minor recesses will remain above the first base 46 and they will not reach said first base 46. If a first bent is made through line Y—Y to form the first engagement bent portion 48, the first minor recesses will just reach the first base 46. If the first bent is made through line Z—Z to form the first engagement bent portion 48, the first minor recesses will not only reach the first base 46, but they will also extend within the first base 46.

Figure 9:
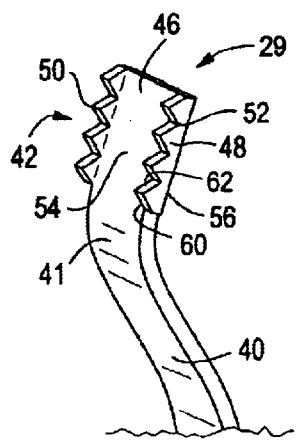
FIG. 9 illustrates a fractional perspective view of a spring member according to another embodiment of the instant invention.

The first peaks 50 have a first front side 60 and a first back side 62, as better shown in FIG. 9. The first front side 60 is closer to the first separating bent 41 than the first back side 62. It is preferable that the first front side 60 is longer than the first back side 62, since such a configuration increases the force required to remove the fastener from a slot, as compared to the force needed to insert the fastener into the same slot.

Exactly the same configuration details apply to the second spring member 31. The sixth angle is the an angle such as A2 corresponding to the configuration of spring member 31, which is substantially the same as the configuration of spring member 29.

Figure 17:
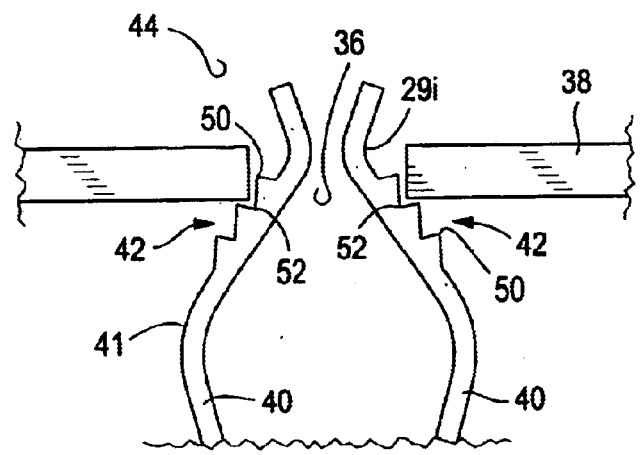
FIG. 17 illustrates two snapping segments of a fastener engaged in a slot of a secondary object according to the present invention.

The operation of the fasteners disclosed in the above preferred embodiments of the present invention is better illustrated in FIG. 17. The fastener 10 is pushed through the slot 36 of the secondary object 38, from the insertion side 44. As the fastener 10 is being pushed through the slot 36, the insertion sections 40 are initially pushed toward each other. In sequence, and after the separating bent 41 has also been passed through the slot 36, the fastener 10 is secured in position by the force exerted by the engagement sections 42 on the edges of the slot 36, greatly increased by the peaks 50 and minor recesses 52 of the engagement sections 42.

The fastener may be attached first to the primary object as described above and illustrated in FIG. 8, or it may be attached first to a slot of the secondary object as also described above and illustrated in FIG. 17. Regardless of which operation takes place first, the fastener is attached in sequence to the respective secondary or primary object.

Vehicles comprising the spring fastener of this invention, connecting two parts, one of the parts comprising a slot in which the fastener is secured by the spring member, are also included within the scope of the instant invention.

The fasteners of the instant invention may be provided with an elastic body and/or extremities as described for example in U.S. Pat. Nos. 5,987,714 and 6,353,981, both of which are incorporated herein by reference.

Automobiles or other vehicles may be made, comprising one or more of the fasteners of the instant invention, providing substantial improvements regarding safety, performance and comfort. As described above, part of a primary object 25 of the vehicle may be supported in the fastening region 16 of the fastener. The fastener may also be secured into a slot 36 of a secondary object 38 of the same vehicle, thus securing the two objects of the vehicle together.

Examples of embodiments demonstrating the operation of the instant invention, have now been given for illustration purposes only, and should not be construed as restricting the scope or limits of this invention in any way.

As aforementioned, each single particular embodiment of the present invention is critical for a specific application. Therefore, only one embodiment may be critical for a certain application, while more than one for other applications.

Any explanations given are speculative and should not restrict the scope of the claims.

What is claimed is:

1. A fastener comprising a U-shaped configuration, the U-shaped configuration having a fastening region within which at least a part of a primary object can be inserted, the fastener comprising a first structural side and a second structural side opposite to the first structural side, both sides adjacent to the fastening region, the first structural side comprising an outer bent barb, which is a partially cut section of the first structural side and extends into the fastening region, the outer bent barb having a first back portion adjacent to the first structural side and a first front portion pointing toward the second structural side, the first front portion having a first angle with respect to the primary object when the primary object is inserted into the fastening region, which is larger than a respective second angle that the first front portion would have with respect to the primary object if the outer barb were straight and not bent, the first back portion of the outer bent barb being longer than the first front portion of the first bent barb, the second structural side comprising an inner bent barb, which is a partially cut section of the second structural side and extends into the fastening region, the inner bent barb having a second back portion adjacent to the second structural side and a second front portion pointing toward the first structural side, the second front portion having a third angle with respect to the primary object when the primary object has been inserted into the fastening region, which the third angle is larger than a respective fourth angle that the second front portion would have with respect to the primary object if the inner barb were straight and not bent, the second back portion of the inner bent barb being longer than the second front portion of the inner bent barb.

2. A fastener as defined in claim 1, wherein at least one of the respective back portions of the inner and/or outer bent barb and the respective front portions of the inner and/or outer bent barb is substantially linear.

3. A fastener as defined in claim 1, wherein both the respective back portion of the inner and/or outer bent barb and the respective front portion of the inner and/or outer bent barb are substantially linear.

4. A fastener as defined in claim 1, wherein a distance separating the front portion of the inner barb from the first structural side and/or the front portion of the outer barb from the second structural side is smaller than half a distance separating the first structural side from the second structural side.

5. A fastener as defined in claim 2, wherein a distance separating the front portion of the inner barb from the first structural side and/or the front portion of the outer barb from the second structural side is smaller than half a distance separating the first structural side from the second structural side.

6. A fastener as defined in claim 3, wherein a distance separating the front portion of the inner barb from the first structural side and/or the front portion of the outer barb from the second structural side is smaller than half a distance separating the first structural side from the second structural side.

7. A fastener as defined in claim 3, wherein at least one of the first back portion of the outer bent barb and the second back portion of the inner bent barb is at least three times longer than the respective front portion.

8. A fastener as defined in claim 6, wherein at least one of the first back portion of the outer bent barb and the second back portion of the inner bent barb is at least three times longer than the respective front portion.

9. A fastener as defined in claim 3, wherein at least one of the first back portion of the outer bent barb and the second back portion of the inner bent barb has an average width, which average width is at least three times shorter than the respective bent barb.

10. A fastener as defined in claim 6, wherein at least one of the first back portion of the outer bent barb and the second back portion of the inner bent barb has an average width, which average width is at least three times shorter than the respective bent barb.

11. A fastener as defined in claim 8, wherein at least one of the first back portion of the outer bent barb and the second back portion of the inner bent barb has an average width, which average width is at least three times shorter than the respective bent barb.

12. A fastener as defined in claim 1, wherein the fastener is made of steel having a thickness, which thickness is larger than a distance separating the front portion of the outer bent barb from the first structural side.

13. A fastener as defined in claim 3, wherein the fastener is made of steel having a thickness, which thickness is larger than a distance separating the front portion of the outer bent barb from the first structural side.

14. A fastener as defined in claim 6, wherein the fastener is made of steel having a thickness, which thickness is larger than the distance separating the front portion of the outer bent barb from the first structural side.

15. A fastener as defined in claim 8, wherein the fastener is made of steel having a thickness, which thickness is larger than the distance separating the front portion of the outer bent barb from the first structural side.

16. A fastener as defined in claim 9, wherein the fastener is made of steel having a thickness, which thickness is larger than the distance separating the front portion of the outer bent barb from the first structural side.

17. A fastener as defined in claim 10, wherein the fastener is made of steel having a thickness, which thickness is larger than the distance separating the front portion of the outer bent barb from the first structural side.

18. A fastener as defined in claim 11, wherein the fastener is made of steel having a thickness, which thickness is larger than the distance separating the front portion of the outer bent barb from the first structural side.

19. A fastener as defined in claim 1, wherein the front side and the back side of at least one of the outer barb and the inner barb forms a front/back angle in the range of 5 to 25 degrees.

20. A fastener as defined in claim 3, wherein the front side and the back side of at least one of the outer barb and the inner barb forms a front/back angle in the range of 5 to 25 degrees.

21. A fastener as defined in claim 6, wherein the front side and the back side of at least one of the outer barb and the inner barb forms a front/back angle in the range of 5 to 25 degrees.

22. A fastener as defined in claim 8, wherein the front side and the back side of at least one of the outer barb and the inner barb forms a front/back angle in the range of 5 to 25 degrees.

23. A fastener as defined in claim 11, wherein the front side and the back side of at least one of the outer barb and the inner barb forms a front/back angle in the range of 5 to 25 degrees.

24. A fastener as defined in claim 12, wherein the front side and the back side of at least one of the outer barb and the inner barb forms a front/back angle in the range of 5 to 25 degrees.

25. A fastener as defined in claim 18, wherein the front side and the back side of at least one of the outer barb and the inner barb forms a front/back angle in the range of 5 to 25 degrees.

26. A fastener as defined in claim 1, further comprising
a first spring member, the first spring member having a first insertion section and a first engagement section, the first insertion section and the first engagement section separated by a first separating bent, the first engagement section comprising a first base and a first engagement bent portion, the first engagement bent portion directed away from the first base at a fifth angle, and comprising first peaks and first minor recesses, the first base having a first middle portion and a first edge portion; and
a second spring member, the second spring member having a second insertion section and a second engagement section, the second insertion section and the second engagement section separated by a second separating bent, the second engagement section comprising a second base and a second engagement bent portion, the second engagement bent portion directed away from the second base at a sixth angle, and comprising second peaks and second minor recesses, the second base having a second middle portion and a second edge portion.

27. A fastener as defined in claim 26, wherein the fifth angle and the sixth angle are in the range of 90° to 179°.

28. A fastener as defined in claim 26, wherein the first minor recesses and the second minor recesses reach the first base and the second base, respectively, or extend within the first base and the second base, respectively.

29. A fastener as defined in claim 26, wherein the first peaks have a first front peak side and a first back peak side, the first front peak side being longer than the first back peak side, and/or wherein the second peaks have a second front peak side and a second back peak side, the second front peak side being longer than the second back peak side.

30. A spring fastener as defined in claim 26, wherein the first engagement bent portion is disposed over the first edge portion of the first base, and/or wherein the second engagement bent portion is disposed over the second edge portion of the second base.

31. A spring fastener as defined in claim 26, wherein the first engagement bent portion is disposed in the vicinity of the first middle portion of the first base, and/or wherein the second engagement bent portion is disposed in the vicinity of the second middle portion of the second base.

32. A vehicle comprising a fastener connecting a primary object and a secondary object with the fastener, the fastener comprising a U-shaped configuration, the U-shaped configuration having a fastening region within which at least a part of a primary object can be inserted, the fastener comprising a first structural side and a second structural side opposite to the first structural side, both sides adjacent to the fastening region, the first structural side comprising an outer bent barb, which is a partially cut section of the first structural side and extends into the fastening region, the outer bent barb having a first back portion adjacent to the first structural side and a first front portion pointing toward the second structural side, the first front portion having a first angle with respect to the primary object when the primary object is inserted into the fastening region, which is larger than a respective second angle that the first front portion would have with respect to the primary object if the outer barb were straight and not bent, the first back portion of the outer bent barb being longer than the first front portion of the first bent barb, the second structural side comprising an inner bent barb, which is a partially cut section of the second structural side and extends into the fastening region, the inner bent barb having a second back portion adjacent to the second structural side and a second front portion pointing toward the first structural side, the second front portion having a third angle with respect to the primary object when the primary object has been inserted into the fastening region, which third angle is larger than a respective fourth angle that the second front portion would have with respect to the primary object if the inner barb were straight and not bent, the second back portion of the inner bent barb being longer than the second front portion of the inner bent barb.

33. A vehicle as defined in claim 32, wherein at least one of the respective back portions of the inner and/or outer bent barb and the respective front portions of the inner and/or outer bent barb is substantially linear.

34. A vehicle as defined in claim 32, wherein both the respective back portion of the inner and/or outer bent barb and the respective front portion of the inner and/or outer bent barb are substantially linear.

35. A vehicle as defined in claim 32, wherein a distance separating the front portion of the inner barb from the first structural side and/or the front portion of the outer barb from the second structural side is smaller than half a distance separating the first structural side from the second structural side.

36. A vehicle as defined in claim 33, wherein a distance separating the front portion of the inner barb from the first structural side and/or the front portion of the outer barb from the second structural side is smaller than half a distance separating the first structural side from the second structural side.

37. A vehicle as defined in claim 34, wherein a distance separating the front portion of the inner barb from the first structural side and/or the front portion of the outer barb from the second structural side is smaller than half a distance separating the first structural side from the second structural side.

38. A vehicle as defined in claim 34, wherein at least one of the first back portion of the outer bent barb and the second back portion of the inner bent barb is at least three times longer than the respective front portion.

39. A vehicle as defined in claim 37, wherein at least one of the first back portion of the outer bent barb and the second back portion of the inner bent barb is at least three times longer than the respective front portion.

40. A vehicle as defined in claim 34, wherein at least one of the first back portion of the outer bent barb and the second back portion of the inner bent barb has an average width, which average width is at least three times shorter than the respective bent barb.

41. A vehicle as defined in claim 37, wherein at least one of the first back portion of the outer bent barb and the second back portion of the inner bent barb has an average width, which average width is at least three times shorter than the respective bent barb.

42. A vehicle as defined in claim 39, wherein at least one of the first back portion of the outer bent barb and the second back portion of the inner bent barb has an average width, which average width is at least three times shorter than the respective bent barb.

43. A vehicle as defined in claim 32, wherein the fastener is made of steel having a thickness, which thickness is larger than a distance separating the front portion of the outer bent barb from the first structural side.

44. A vehicle as defined in claim 34, wherein the fastener is made of steel having a thickness, which thickness is larger than a distance separating the front portion of the outer bent barb from the first structural side.

45. A vehicle as defined in claim 37, wherein the fastener is made of steel having a thickness, which thickness is larger than the distance separating the front portion of the outer bent barb from the first structural side.

46. A vehicle as defined in claim 39, wherein the fastener is made of steel having a thickness, which thickness is larger than the distance separating the front portion of the outer bent barb from the first structural side.

47. A vehicle as defined in claim 40, wherein the fastener is made of steel having a thickness, which thickness is larger than the distance separating the front portion of the outer bent barb from the first structural side.

48. A vehicle as defined in claim 41, wherein the fastener is made of steel having a thickness, which thickness is larger than the distance separating the front portion of the outer bent barb from the first structural side.

49. A vehicle as defined in claim 42, wherein the fastener is made of steel having a thickness, which thickness is larger than the distance separating the front portion of the outer bent barb from the first structural side.

50. A vehicle as defined in claim 32, wherein the front side and the back side of at least one of the outer barb and the inner barb forms a front/back angle in the range of 5 to 25 degrees.

51. A vehicle as defined in claim 34, wherein the front side and the back side of at least one of the outer barb and the inner barb forms a front/back angle in the range of 5 to 25 degrees.

52. A vehicle as defined in claim 37, wherein the front side and the back side of at least one of the outer barb and the inner barb forms a front/back angle in the range of 5 to 25 degrees.

53. A vehicle as defined in claim 39, wherein the front side and the back side of at least one of the outer barb and the inner barb forms a front/back angle in the range of 5 to 25 degrees.

54. A vehicle as defined in claim 42, wherein the front side and the back side of at least one of the outer barb and the inner barb forms a front/back angle in the range of 5 to 25 degrees.

55. A vehicle as defined in claim 43, wherein the front side and the back side of at least one of the outer barb and the inner barb forms a front/back angle in the range of 5 to 25 degrees.

56. A vehicle as defined in claim 49, wherein the front side and the back side of at least one of the outer barb and the inner barb forms a front/back angle in the range of 5 to 25 degrees.

57. A vehicle as defined in claim 32, wherein the fastener further comprises
a first spring member, the first spring member having a first insertion section and a first engagement section, the first insertion section and the first engagement section separated by a first separating bent, the first engagement section comprising a first base and a first engagement bent portion, the first engagement bent portion directed away from the first base at a fifth angle, and comprising first peaks and first minor recesses, the first base having a first middle portion and a first edge portion; and
a second spring member, the second spring member having a second insertion section and a second engagement section, the second insertion section and the second engagement section separated by a second separating bent, the second engagement section comprising a second base and a second engagement bent portion, the second engagement bent portion directed away from the second base at a sixth angle, and comprising second peaks and second minor recesses, the second base having a second middle portion and a second edge portion.

58. A vehicle as defined in claim 57, wherein the fifth angle is in the range of 90° to 179°.

59. A vehicle as defined in claim 57, wherein the first minor recesses and the second minor recesses reach the first base and the second base, respectively, or extend within the first base and the second base, respectively.

60. A vehicle as defined in claim 57, wherein the first peaks have a first front peak side and a first back peak side, the first front peak side being longer than the first back peak side, and/or wherein the second peaks have a second front peak side and a second back peak side, the second front peak side being longer than the second back peak side.

61. A vehicle fastener as defined in claim 57, wherein the first engagement bent portion is disposed over the first edge portion of the first base, and/or wherein the second engagement bent portion is disposed over the second edge portion of the second base.

62. A vehicle fastener as defined in claim 57, wherein the first engagement bent portion is disposed in the vicinity of the first middle portion of the first base, and/or wherein the second engagement bent portion is disposed in the vicinity of the second middle portion of the second base.

* * * * *